US009202357B2

(12) United States Patent
Rehman

(10) Patent No.: US 9,202,357 B2
(45) Date of Patent: Dec. 1, 2015

(54) VIRTUALIZATION AND QUALITY OF SENSOR DATA

(75) Inventor: Samuelson Rehman, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1611 days.

(21) Appl. No.: 11/685,655

(22) Filed: Mar. 13, 2007

(65) Prior Publication Data

US 2008/0224866 A1 Sep. 18, 2008

(51) Int. Cl.

| | |
|---|---|
| ***G06Q 10/00*** | (2012.01) |
| ***G08B 13/24*** | (2006.01) |
| *G06G 1/14* | (2006.01) |
| *G06Q 20/00* | (2012.01) |
| *G07B 17/00* | (2006.01) |
| *G07F 19/00* | (2006.01) |
| *H04M 15/00* | (2006.01) |

(52) U.S. Cl.
CPC .......... *G08B 13/248* (2013.01); *G08B 13/2417* (2013.01); *G08B 13/2477* (2013.01)

(58) Field of Classification Search
USPC .......................................... 705/22, 28, 30, 34
See application file for complete search history.

(56) References Cited

U.S. PATENT DOCUMENTS

| | | | | |
|---|---|---|---|---|
| 5,365,516 | A | 11/1994 | Jandrell | |
| 6,600,418 | B2 | 7/2003 | Francis et al. | |
| 6,832,251 | B1 * | 12/2004 | Gelvin et al. | 709/224 |
| 6,843,415 | B2 | 1/2005 | Vogler | |
| 7,000,834 | B2 | 2/2006 | Hind et al. | |
| 7,295,132 | B2 | 11/2007 | Steiner | |
| 7,403,120 | B2 | 7/2008 | Duron et al. | |
| 7,633,387 | B2 | 12/2009 | Carmichael et al. | |
| 7,800,499 | B2 | 9/2010 | Rehman | |
| 8,042,737 | B2 | 10/2011 | Rehman | |
| 8,099,737 | B2 | 1/2012 | Rehman | |
| 2002/0111819 | A1 * | 8/2002 | Li et al. | 705/1 |
| 2003/0009398 | A1 * | 1/2003 | Lin et al. | 705/28 |
| 2003/0115072 | A1 | 6/2003 | Manucha et al. | |
| 2003/0144985 | A1 | 7/2003 | Ebert | |
| 2003/0227392 | A1 | 12/2003 | Ebert et al. | |
| 2004/0090472 | A1 | 5/2004 | Risch et al. | |
| 2004/0093479 | A1 | 5/2004 | Ramchandran | |
| 2004/0243636 | A1 | 12/2004 | Hasiewicz et al. | |
| 2004/0249590 | A1 | 12/2004 | Ota et al. | |
| 2005/0177466 | A1 * | 8/2005 | Willins | 705/28 |
| 2005/0204014 | A1 | 9/2005 | Yao et al. | |
| 2006/0033608 | A1 | 2/2006 | Jules et al. | |

(Continued)

OTHER PUBLICATIONS

U.S. Appl. No. 11/685,673, Final Office Action mailed on Nov. 2, 2010, 13 pages.

(Continued)

*Primary Examiner* — Ig T An
(74) *Attorney, Agent, or Firm* — Kilpatrick Townsend & Stockton LLP

(57) ABSTRACT

A method for generating information related to a first object based on sensor data associated with a second object includes determining a containment hierarchy between the first object and the second object. Sensor data associated with the second object is determined using the containment hierarchy. A quality of data index is determined for the sensor data associated with the second object using the containment hierarchy. Information related to the first object is generated based on the sensor data associated with the second object and the quality of data index.

21 Claims, 11 Drawing Sheets

(56) References Cited

U.S. PATENT DOCUMENTS

| | | | | |
|---|---|---|---|---|
| 2006/0080732 | A1 | 4/2006 | Ohkubo et al. | |
| 2006/0092072 | A1 | 5/2006 | Steiner | |
| 2006/0144940 | A1 * | 7/2006 | Shannon et al. | 235/385 |
| 2006/0170565 | A1 | 8/2006 | Husak et al. | |
| 2006/0181397 | A1 | 8/2006 | Limbachiya | |
| 2006/0184980 | A1 | 8/2006 | Cole | |
| 2006/0230276 | A1 | 10/2006 | Nochta | |
| 2007/0008129 | A1 | 1/2007 | Soliman | |
| 2007/0093991 | A1 | 4/2007 | Hoogenboom | |
| 2007/0174146 | A1 * | 7/2007 | Tamarkin et al. | 705/28 |
| 2007/0208445 | A1 * | 9/2007 | Gibson et al. | 700/115 |
| 2007/0210916 | A1 | 9/2007 | Ogushi et al. | |
| 2007/0219916 | A1 * | 9/2007 | Lucas | 705/58 |
| 2007/0229229 | A1 | 10/2007 | Nelson et al. | |
| 2007/0257857 | A1 | 11/2007 | Marino et al. | |
| 2007/0260428 | A1 | 11/2007 | Anderson et al. | |
| 2007/0283005 | A1 | 12/2007 | Beliles et al. | |
| 2008/0005287 | A1 | 1/2008 | Harvey et al. | |
| 2008/0024268 | A1 | 1/2008 | Wong | |
| 2008/0030335 | A1 | 2/2008 | Nishida et al. | |
| 2008/0052201 | A1 * | 2/2008 | Bodin et al. | 705/28 |
| 2008/0099557 | A1 * | 5/2008 | James | 235/385 |
| 2008/0224867 | A1 | 9/2008 | Rehman | |
| 2008/0302871 | A1 | 12/2008 | Rehman | |
| 2008/0303667 | A1 | 12/2008 | Rehman | |
| 2008/0307435 | A1 | 12/2008 | Rehman | |
| 2009/0005916 | A1 | 1/2009 | Wainwright et al. | |
| 2009/0096608 | A1 | 4/2009 | Rehman | |
| 2010/0029299 | A1 | 2/2010 | Riise et al. | |

OTHER PUBLICATIONS

U.S. Appl. No. 11/685,673, Final Office Action mailed on Feb. 10, 2014, 14 pages.

U.S. Appl. No. 11/685,673, Final Office Action mailed on Sep. 16, 2009, 16 pages.

U.S. Appl. No. 11/685,673, Final Office Action mailed on Jan. 11, 2013, 17 pages.

U.S. Appl. No. 11/685,673, Non-Final Office Action mailed on Aug. 26, 2013, 12 pages.

U.S. Appl. No. 11/685,673, Non-Final Office Action mailed on May 11, 2010, 12 pages.

U.S. Appl. No. 11/685,673, Non-Final Office Action mailed on Aug. 3, 2012, 12 pages.

U.S. Appl. No. 11/685,673, Non-Final Office Action mailed on Apr. 10, 2009, 8 pages.

U.S. Appl. No. 11/758,527, Final Office Action mailed on Mar. 7, 2011, 17 pages.

U.S. Appl. No. 11/758,527, Non-Final Office Action mailed on Sep. 30, 2010, 13 pages.

U.S. Appl. No. 11/758,527, Notice of Allowance mailed on Sep. 16, 2011, 16 pages.

U.S. Appl. No. 11/758,532, Final Office Action mailed on Dec. 16, 2009, 17 pages.

U.S. Appl. No. 11/758,532, Non-Final Office Action mailed on Jun. 23, 2009, 13 pages.

U.S. Appl. No. 11/758,532, Notice of Allowance mailed on Jun. 11, 2010, 20 pages.

U.S. Appl. No. 11/758,538, Final Office Action mailed on Jul. 24, 2009, 11 pages.

U.S. Appl. No. 11/758,538, Final Office Action mailed on Aug. 4, 2010, 20 pages.

U.S. Appl. No. 11/758,538, Non-Final Office Action mailed on Feb. 19, 2010, 15 pages.

U.S. Appl. No. 11/758,538, Non-Final Office Action mailed on Mar. 18, 2011, 5 pages.

U.S. Appl. No. 11/758,538, Non-Final Office Action mailed on Mar. 31, 2009, 7 pages.

U.S. Appl. No. 11/758,538, Notice of Allowance mailed on Jul. 22, 2011, 7 pages.

U.S. Appl. No. 11/871,829, Final Office Action mailed on Dec. 23, 2011, 16 pages.

U.S. Appl. No. 11/871,829, Final Office Action mailed on Sep. 13, 2013, 19 pages.

U.S. Appl. No. 11/871,829, Non-Final Office Action mailed on Jun. 8, 2011, 11 pages.

U.S. Appl. No. 11/871,829, Non-Final Office Action mailed on Mar. 27, 2013, 18 pages.

U.S. Appl. No. 11/871,829, Non-Final Office Action mailed on Jan. 31, 2014, 19 pages.

* cited by examiner

VIRTUALIZATION AND QUALITY OF SENSOR DATA

CROSS-REFERENCES TO RELATED APPLICATIONS

This application is related to U.S. patent application Ser. No. 11/685,673, filed Mar. 13, 2007 and entitled “Real-time and Offline Tracking Using Passive RFID,” the disclosure of which is incorporated by reference herein for all purposes.

BACKGROUND OF THE INVENTION

Embodiments of the present invention generally relate to Radio Frequency Identification (RFID) applications. More specifically, embodiments of the present invention relate to techniques for virtualization and quality of sensor data.

Radio Frequency Identification (RFID) is an automatic identification method which relies on the storing and remotely retrieving of data using devices, such as RFID tags or transponders. RFID tags or transponders are also known as proximity, proxy, or contactless cards, because data from an RFID tag can be retrieved without physical contact. Generally, a device, such as an RFID reader, uses radio waves to remotely retrieve a unique identifier stored using the RFID tag when the RFID tag is within proximity of the RFID reader. RFID tags can be attached to or incorporated into a product, animal, or person for the purpose of identification by the RFID reader. RFID readers can be placed on doorways, in train cars, over freeways, mounted on vehicles, and also can be embodied in mobile handheld devices.

RFID technologies have been traditionally implemented in different ways by different manufacturers, although global standards are being developed. Thus, computer applications using RFID are also typically hard-coded to specific RFID devices sold by the same manufacture. One problem with this arrangement is that these computer applications have traditionally been limited to using only the sensor data retrieved from the vendor supplied RFID readers.

Moreover, in order to provide automated shipping and receiving, real-time inventory, automated shipping and received, and real-time security, other types of RFID sensor devices, such as environment sensors (e.g., temperature and humidity sensors), location sensors (e.g., Global Positioning System or GPS devices), and notification devices, may be required. Accordingly, with the addition of each sensor device, a specific application may be required to access the sensor data from the sensor device. This vendor lock-in leads to having too many non-integrated applications, creates unnecessary complexity, and also increases costs associated with the management and deployment of RFID technologies.

One solution is to embed the sensor device with the RFID tag. For example, one cold chain solution provides an RFID tag embedded with a temperature sensor. Cold chain refers to a temperature-controlled supply chain. An unbroken cold chain is an uninterrupted series of storage and distribution activities which maintain a given temperature range. A reader can read both the identifier of the RFID as well as the temperature from the embedded sensor.

However, by embedding sensors with RFID tags, the cost, and complexity associated with each RFID tag increase. Furthermore, computer applications configured to read the sensor data are still tied directly to specific RFID readers. Thus, the only items for which sensor data can be used from those applications are still those that can be tagged and directly sensed using the specific vendor supplied RFID readers.

Accordingly, what is desired are improved methods and apparatus for solving the problems discussed above, while reducing the drawbacks discussed above.

BRIEF SUMMARY OF THE INVENTION

Embodiments of the present invention generally relate to Radio Frequency Identification (RFID) applications. More specifically, embodiments of the present invention relate to techniques for virtualization and quality of sensor data.

In various embodiments, a method for generating information related to a first object based on sensor data associated with a second object includes determining a containment hierarchy between the first object and the second object. In general, the containment hierarchy defines a set of rules, policies, relationships, criteria, and interactions that describe associations between the first object and the second object. Sensor data associated with the second object is then determined using the containment hierarchy. A quality of data index is determined for the sensor data associated with the second object using the containment hierarchy. Information related to the first object is generated based on the sensor data associated with the second object and the quality of data index.

In some embodiments, a static mapping is received for the first object and the second object. A dynamic mapping may be determined for the first object and the second object based on observations related to the first object and observations related to the second object. Information may be received specifying topology of an environment. The containment hierarchy may be generated based on the static mapping, the dynamic mapping, and the topology of the environment.

In various embodiments, determining sensor data associated with the second object using the containment hierarchy includes identifying one or more properties of the second object as related to the first object using the containment hierarchy. Sensor data associated with the one or more properties of the second object may then be obtained. Determining the quality of data index using the containment hierarchy for the inherited sensor data may include identifying a relationship between the first object and a property of the second object using the containment hierarchy. A weighting value associated with the property of the second object may be determined. Then, whether the relationship between the first object and the second object satisfies a pre-determined criteria may be determined. The quality of data index may be generated based on the determination whether the relationship satisfies the pre-determined criteria and the weighting value.

In one embodiment, a response including the information related to the first object is generated based on a request from an application. The information related to the first object to one or more applications may be transmitted using a push protocol.

In various embodiments, a method for virtualization of sensor data includes receiving a static mapping for a first object and a second object. A dynamic mapping is determined for the first object and the second object based on sensor data related to the first object and sensor data related to the second object. Information is then received specifying topology of an environment. A containment hierarchy is generated based on the static mapping, the dynamic mapping, and the topology of the environment.

In one embodiment, a request may be received for sensor data related to the first object. A response may be generated to the request using the containment hierarchy, the response including the portion of sensor data related to the second object that is identified with the first object. In some embodiments, a quality of data index may be received. The quality of data index may be associated with the containment hierarchy for the portion of sensor data related to the second object. In further embodiments, whether the portion of sensor data related to the second object may be determined whether relevant to the first object based on the quality of data index.

In various embodiments, the containment hierarchy may be stored for subsequent use to access the portion of information related to the second object. Sensor data related to the first object may be received that includes an identifier associated with an RFID tag. Sensor data related to the second object may be received that includes temperature data associated with a temperature sensor.

In one embodiment, a computer program product is stored on a computer readable medium for generating information related to a first object based on sensor data associated with a second object. The computer program product includes code for determining a containment hierarchy between the first object and the second object, code for determining sensor data associated with the second object using the containment hierarchy, code for determining a quality of data index for the sensor data associated with the second object using the containment hierarchy, ad code for generating information related to the first object based on the sensor data associated with the second object and the quality of data index.

In another embodiment, a computer program product is stored on a computer readable medium for virtualization of sensor data. The computer program product includes code for receiving a static mapping for a first object and a second object, code for determining a dynamic mapping for the first object and the second object based on sensor data related to the first object and sensor data related to the second object, code for receiving information specifying topology of an environment, and code for generating a containment hierarchy based on the static mapping, the dynamic mapping, and the topology of the environment.

In yet another embodiment, a data processing system includes a processor and a memory. The memory is coupled to the processor and configured to store a plurality of code modules which when executed by the processor cause the processor to receive a static mapping for a first object and a second object, determine a dynamic mapping for the first object and the second object based on sensor data related to the first object and sensor data related to the second object, receive information specifying topology of an environment, and generate a containment hierarchy based on the static mapping, the dynamic mapping, and the topology of the environment.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Embodiments of the present invention generally relate to sensor technologies and more specifically to techniques for virtualization and quality of sensor data. In order to better understand the present invention, aspects of the environment within which the invention operates will first be described.

In order to better understand the present invention, aspects of the environment within which various embodiments operate will first be described.

Collection of Sensor Data

In various embodiments, methods and systems for collection of sensor data that may incorporate embodiments of the present invention augment enterprise software with RFID and sensor technologies. The methods and systems generally provides a faster reasons loop, greater visibility, an extensible framework, and scalability for the collection of sensor data from a variety of sensor devices and the processing of sensor data by a variety of applications. The systems typically can be deployed in locations where sensor devices can provide better insight into business processes.

In various embodiments, the methods and systems provide localized management and control of sensor devices through an extensible framework and interface. The methods and systems can funnel data sensor and environment data from RFID readers and sensor device, typically located at the periphery of an enterprise, for access by core applications.

Figure 1:
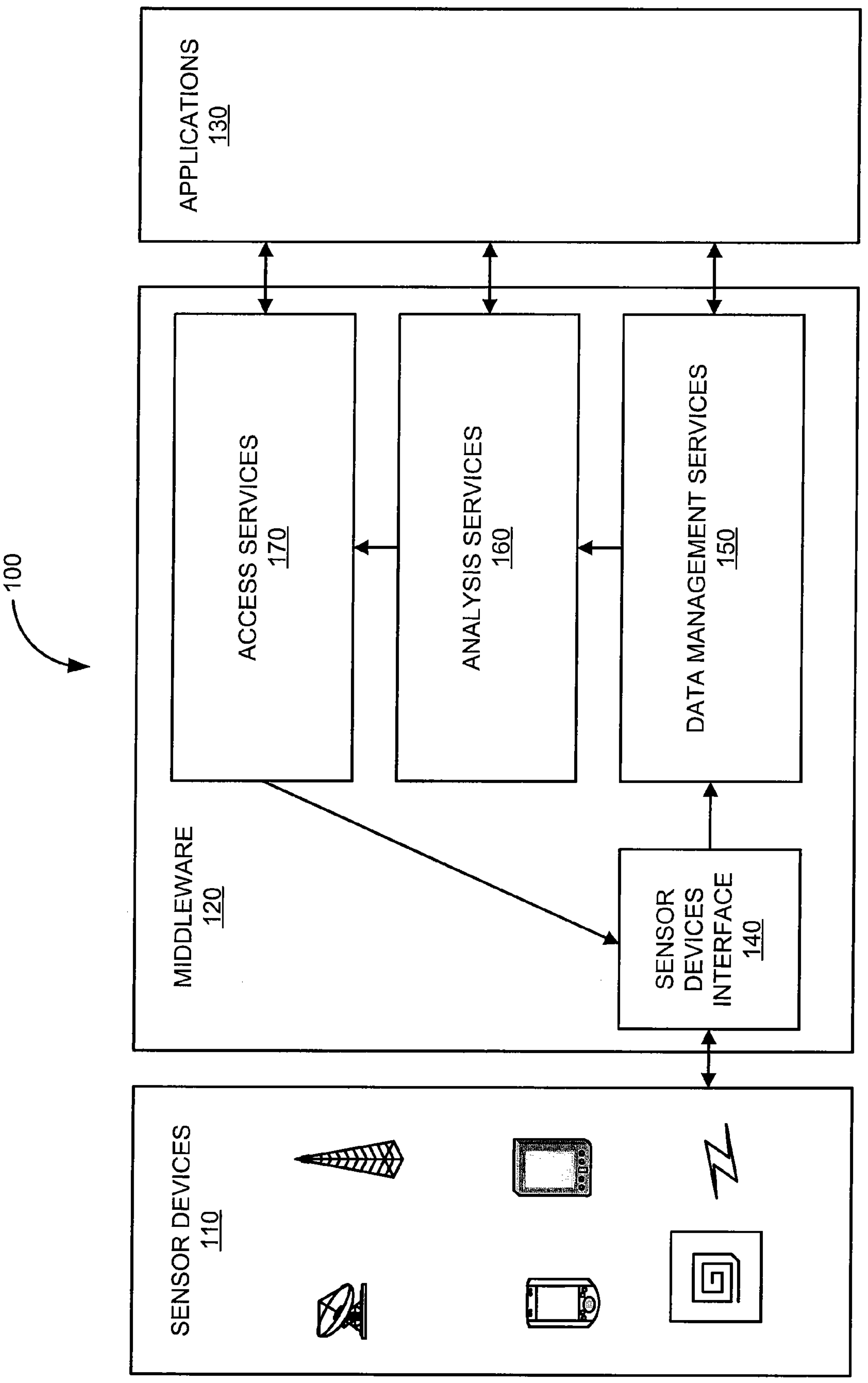
FIG. 1 is a simplified block diagram of a system that may incorporate embodiments of the present invention.

FIG. 1 illustrates a simplified block diagram of a system 100 that may incorporate embodiments of the present invention. FIG. 1 is merely illustrative of an embodiment incorporating the present invention and does not limit the scope of the invention as recited in the claims. One of ordinary skill in the art would recognize other variations, modifications, and alternatives.

As shown in FIG. 1, system 100 includes sensor devices 110, middleware 120, and applications 130. Middleware 120 is communicatively coupled to sensor devices 110 and to applications 130. Middleware 120 includes sensor devices interface 140, data management services 150, analysis service 160, and access services 170.

Sensor devices 110 include contactless cards, transponders, RFID tags, smart labels, fixed interrogators/readers, mobile readers, handheld readers, image capture devices, video captures devices, audio capture devices, environmental sensing devices (e.g., temperature, humidity, and air pressure sensors), location information devices (e.g., Global Positioning System), weight sensing devices, notification and alert generation devices, and the like. One example of an RFID tag is described further with respect to FIG. 2. One example of an RFID reader is described further with respect to FIG. 3. In some embodiments, sensor devices 110 include hardware and/or software elements that respond to external input from middleware 120 to perform actions, manipulate objects, and the like.

In general, middleware 120 includes hardware and/or software elements that provide an interface for using sensor devices 110. In this example, middleware 120 includes sensor devices interface 140, data management services 150, analysis service 160, and access services 170.

Sensor devices interface 140 includes hardware and/or software elements that communicate with sensor devices 110. One example of sensor devices interface 140 is Oracle's Application Server: Sensor Edge Server from Oracle Corporation, Redwood Shores, Calif. In various embodiments, sensor devices interface 140 receives sensor data from sensor devices 110. In some embodiments, sensor devices interface 140 communicates with one or more of sensor devices 110 to provide external input from middleware 120 to cause the one or more of sensor devices 110 to display notifications and alerts, and to perform responses, actions, or activities (e.g., control a conveyor belt or robot).

In general, sensor data is any information, signal, communication, and the like, received from sensor devices 110. Some examples of sensor data are unique, or semi-unique identifiers associated with RFID tags, temperature information received from a temperature sensor, data and information associated with humidity and pressure, position and location information, still-image data, video sequence data, motion picture data, audio data, and the like.

Data management services 150 include hardware and/or software elements that provide storage of and access to collected sensor data. Some examples of data management services 150 include databases, storage arrays, storage area networks, network attached storage, data security devices, data management devices, and the like.

Analysis services 160 include hardware and/or software elements that provide analysis of collected sensor data. Some examples of analysis which may be performed by analysis services 160 include business intelligence, business process management, inventory management, distribution and supply chain management, accounting, reporting, and the like.

Access services 170 include hardware and/or software elements that provide access to features of middleware 120. In various embodiments, access services 170 include hardware and/or software elements that manage sensor devices 110 through sensor devices interface 140. In some embodiments, access services 170 include hardware and/or software elements provide access to sensor data via data management services 150. In some embodiments, access services 170 include hardware and/or software elements that provide access to analysis services 160. For example, in various embodiments, access services 170 provides one or more users or computer processes with a portal using web services to access sensor data from analysis services 160 and data management services 150. In further embodiments, access services 170 allows the one or more users or computer processes to initiate or coordinate actions or activities using sensor devices 110 through sensor devices interface 140.

Applications 130 include hardware and/or software elements that access sensor data and/or control sensor devices 110 through middleware 120. Some examples of applications 130 are Oracle's E-Business Suite, PeopleSoft Enterprise, and JD Edwards Enterprise from Oracle Corporation, Redwood Shores, Calif.

In one example of operation, system 100 collects sensor data from one or more of sensor devices 110 (e.g., an RFID reader). For example, a plurality of RFID readers detect the presents of a plurality of RFID tags at various times during the movement of objects in a warehouse or at locations in a supply-chain.

In this example, middleware 120 collects the sensor data via sensor devices interface 140, and stores the sensor data using data management services 150. Middleware 120 provides access and analysis of collected and stored sensor data to applications 130 via analysis service 160 and access services 170. Accordingly, system 100 provides a framework for accessing a wide variety of sensor devices to obtain sensor data from a variety of applications.

In various embodiments, system 100 deployed in locations where sensor devices 110 can provide better insight into business processes. System 100 provides greater visibility of sensor data by allowing non-vendor specific applications to have access to sensor data. This extensible framework also provides scalability for the collection of sensor data from a variety of sensor devices. In various embodiments, system 100 provides localized management and control of sensor devices 100 through middleware 130 and sensor devices interface 140.

Figure 2:
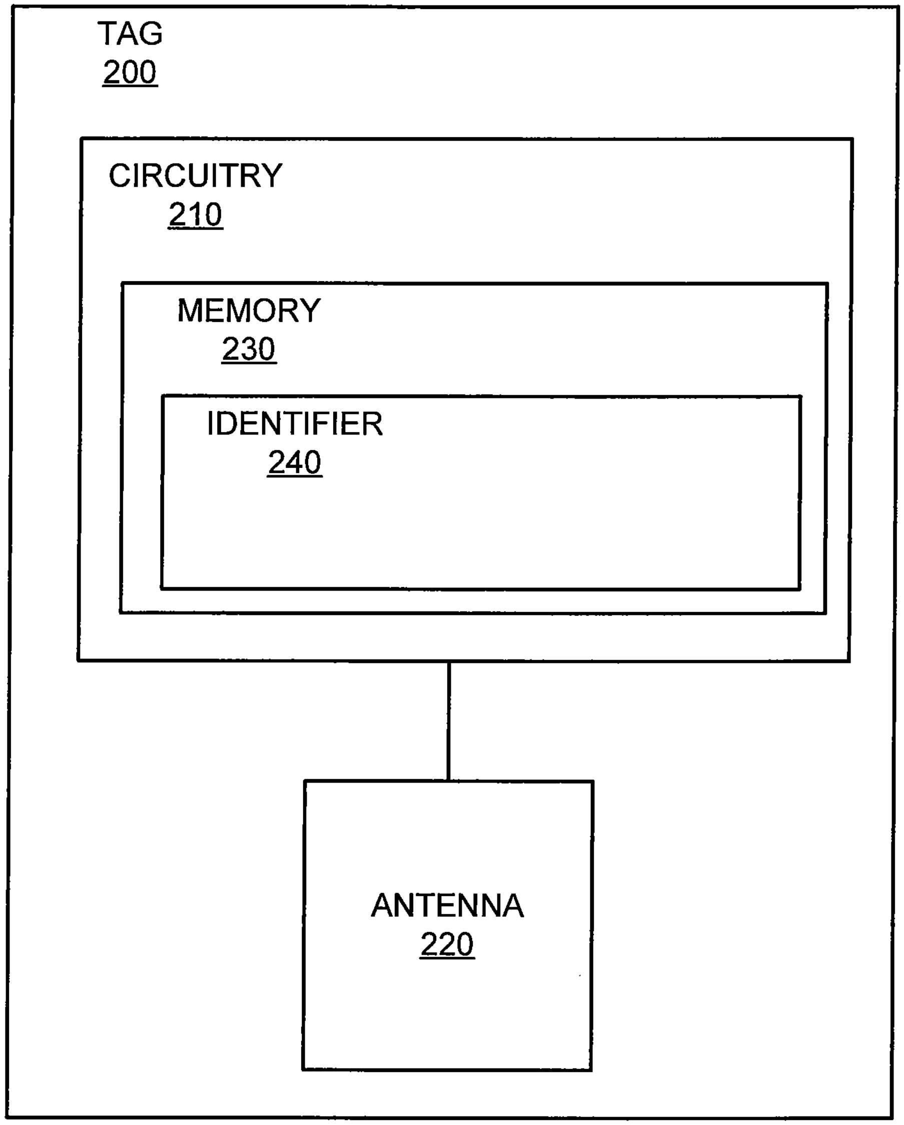
FIG. 2 is a block diagram of a tag in one embodiment according to the present invention.

FIG. 2 is a block diagram of a tag 200 in one embodiment according to the present invention. In this example, tag 200 includes circuitry 210 coupled to an antenna 220. Circuitry 210 includes a memory 230. Memory 230 includes an identifier 240.

In operation, tag 200 typically obtains power to operate circuitry 210 from an inductive coupling of tag 200 to energy circulating around a reader coil (e.g., low frequency, high frequency, very high frequency, and ultra high frequency radio waves). In some embodiments, tag 200 operates in a low frequency (LF) band (e.g., 13.56 MHz). Alternatively, tag 200 may use radiative coupling, such as in ultra-high frequency (UHF) and microwave RFID systems to energize circuitry 210 which in turn communicates data (e.g., identifier 240) stored in memory 230 via antenna 220. Antenna 220 typically is a conductive element that enables circuitry 210 to communicate data.

In general, tag 200 and other contactless cards, smart labels, transponders, and the like, typically use three basic technologies: active, passive, and semi-passive. Active tags typically use a battery to power microchip circuitry and transmit signals to readers. Active tags can generally be read from distances of 100 ft. or more. Passive tags do not include a battery. Instead, passive tags draw power from a magnetic field that is formed by the coupling of an antenna element in the tags with the coiled antenna from a reader. Semi-passive tags are similar to active tags in that they use a battery to run microchip circuitry. However, in semi-passive tags, the battery generally is not used to broadcast a signal to the reader.

In various embodiments, circuitry 210 may include an RF interface and control logic, in addition to memory 230, combined in a single integrated circuit (IC), such as a low-power complementary metal oxide semiconductor (CMOS) IC. For example, the RF interface can be an analog portion of the IC, and the control logic and memory 230 can be a digital portion of the IC. Memory 230 may be a non-volatile read-write memory, such as an electrically erasable programmable read only memory (EEPROM).

In some embodiments, circuitry 210 includes an antenna tuning capacitor and an RF-to-DC rectifier system designed for Antenna 220, which is the coupling element for tag 200. Antenna 210 can enable tag 200 using passive RFID to obtain power to energize and active circuitry 210. Antenna 220 can have many different shapes and sizes, depending on the type of coupling system (e.g., RFID) being employed.

Some examples of tag 200 are ISO 11784 & 11785 tags, ISO 14223/1 tags, ISO 10536 tags, ISO 14443 tags, ISO 15693 tags, ISO 18000 tags, EPCglobal, ANSI 371.1, 2 and 3, AAR S918, and the like.

In some embodiments, circuitry 210 of tag 200 is configured to read from and write to memory 230. Identifier 240 is generally a unique serial number. Identifier 240 may also be hard coded into circuitry 210. In some embodiments, information such as a product information and location may be encoded in memory 230 of circuitry 210.

Figure 3:
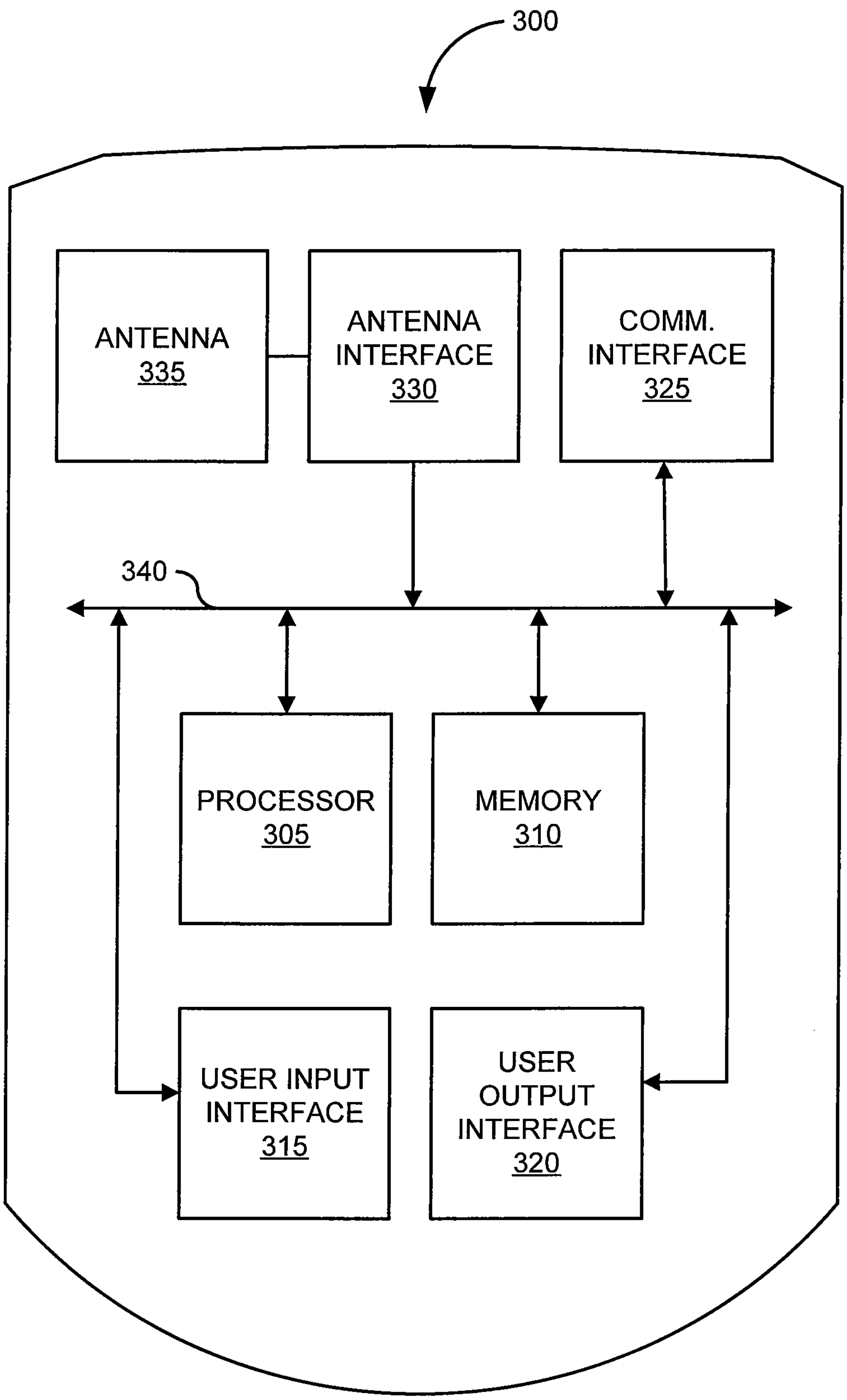
FIG. 3 is a block diagram of an interrogator/reader in one embodiment according to the present invention.

FIG. 3 is a block diagram of an interrogator/reader 300 in one embodiment according to the present invention. In this example, reader 300 includes a processor 305, a memory 310, a user input interface 315, a user output interface 320, a communications interface 325, an antenna interface 330, an antenna 335, and a system bus 340. Processor 305, memory 310, user input interface 315, user output interface 320, communications interface 325, and antenna interface 330 are coupled via system bus 340. Antenna interface 320 is linked to antenna 325.

In this example, reader 300 uses radio frequencies to communicate with tag 200 using antenna 335. For example, when tag 200 is within proximity of reader 300, tag 200 draws power from a magnetic field that is formed by the coupling of antenna 220 from tag 200 with antenna 335 from reader 300. Circuitry 210 from tag 200 then transmits identifier 240 via antenna 220. Reader 300 detects the transmission using antenna 335 and receives identifier 240 through antenna interface 330. In some embodiments, reader 300 stores the identifier 240 in memory 310. Reader 300 may transmit data, including identifier 240, in digital or analog form to sensor devices interface 140 using communications interface 325.

In various embodiments, reader 300 uses low, high, ultra-high, and microwave frequencies to store and retrieve data from products or devices using RFID tags.

Figure 4:
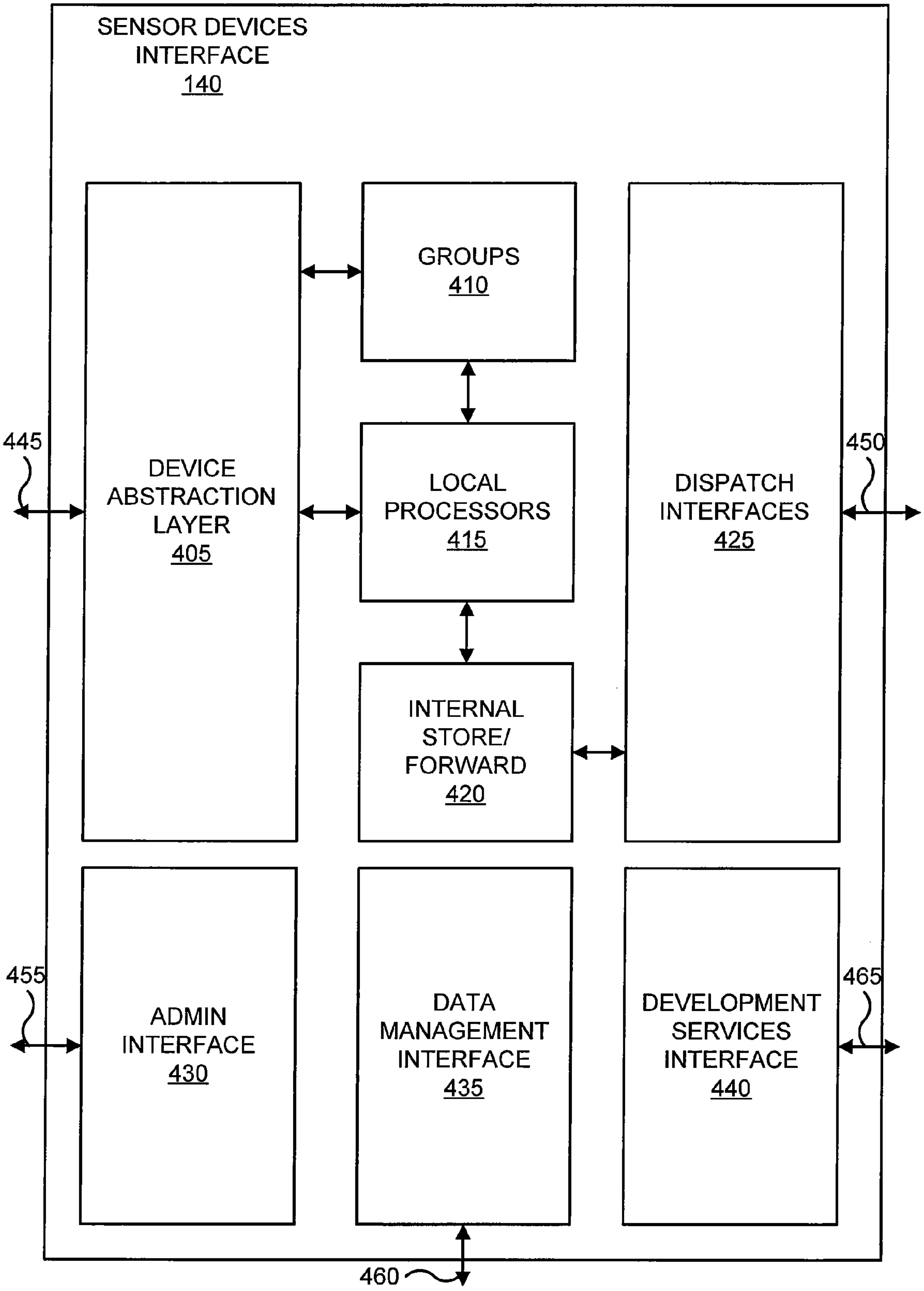
FIG. 4 is a block diagram of a system for interfacing with sensor devices to provide virtualization and quality of data in one embodiment according to the present invention.

FIG. 4 is a block diagram of sensor devices interface 140 for interfacing with sensor devices 110 to provide virtualization and quality of data in one embodiment according to the present invention.

In this example, sensor devices interface 140 includes device abstraction layer 405, groups module 410, local processors 415, internal store/forward module 420, dispatch interfaces 425, administration interfaces 430, data management interface 435, and development services interface 440. Device abstraction layer 405 is linked to groups module 410 and local processors 415. Local processors 415 are linked to groups module 410 and to internal store/forward module 420. Internal store/forward module 420 is link to dispatch interface 425.

Device abstraction layer 405 communicates via line 445 with sensor devices 110 to received collected sensor data and drive operations of one or more of sensor devices 110. Dispatch interface 425 communicates collected sensor data via line 450 with one or more applications, such as analysis services 160 and applications 130. Administration interface 430 is link via line 455 to one or more computers systems that administer the operations of sensor devices interface 140. Data management interface 435 communicates collected sensor data via line 460 with data repositories, such as a database provided by data management services 150. Development services interface 440 communicates via line 465 with applications to provide an Application Program Interface (API) to collected sensor data and operations of one or more of sensor devices 110.

Device abstraction layer 405 includes hardware and/or software elements that received collected sensor data and drive the operations of one or more of sensor devices 110. In one embodiment, device abstraction layer 405 provides a plug-and-play architecture and extendable driver framework that allows applications (e.g., Applications 130) to be device agnostic and utilize various sensors, readers, printers, and notification devices. In some embodiments, device abstraction layer 405 may include out-of-the-box drivers for readers, printers, and display/notification devices from various vendors, such as Alien of Morgan Hill, Calif. and Intermec of Everett, Wash.

Groups module 410 and local processors 415 include hardware and/or software elements that provide a framework for simple, aggregate, and programmable filtering of sensor data received from device abstraction layer 405. For example, using groups module 410, filters executed by local processors 415 are applied to a single device or to logical groups of devices to collect sensor data that satisfies predefined criteria. Local processors 415 include hardware and/or software elements for creating filters and rules using sensor data. Some examples of filters may include Pass Filter, Movement Filter, Shelf Filter, Cross Reader Filter, Check Tag Filter, Pallet Shelf Filter, Pallet Pass Filter, and Debug Filter. In some embodiments, filters and rules may be created using the JavaScript programming language and through the use of regular expressions.

Internal store/forward module 420 includes hardware and/or software elements that provide an interface between local processors 415 and dispatch interfaces 425. In one example, internal store/forward module 420 includes a buffer used for communication between local processors 415 and dispatch interfaces 424. Dispatch interfaces 425 include hardware and/or software elements that disseminate sensor data to applications (e.g., applications 130). In some embodiments, dispatch interfaces 425 include a web services component, an HTTP-dispatcher component, a stream dispatcher component, and an interface supporting subscription or query based notification services.

Administration interface 430 includes hardware and/or software elements that managing operations of sensor devices interface 140. In one example, administration interface 430 provides a task oriented user interface for adding, configuring, and removing devices, creating and enabling filters and rules, and creating and enabling dispatchers that disseminate sensor data.

Data management services 435 include hardware and/or software elements that provide reporting, associations, and archiving of sensor data. Development services interface 440 includes hardware and/or software elements that provide an Application Program Interface (API) to collected sensor data and operations of one or more of sensor devices 110. Some examples of API services provided by development services interface 440 include web services, IS services, device management, monitoring interfaces, EPC management, and raw sensor data interfaces.

In one example of operation, sensor devices interface 140 collects sensor data from sensor devices 110 (e.g., RFID readers, RFID tags or labels, temperature sensors, laser diodes, etc.) using device abstraction layer 405. Groups module 410 and local processors 415 filter, clean, and normalize the collected sensor data and forward "relevant" events, such as those that meet predefined criteria or are obtained from a selected device, to internal store/forward interface 420.

The filtered sensor data is then distributed by internal store/forward interface 420 to various distribution systems through dispatch interfaces 425. The unfiltered and/or filters sensor data may further be archived and storage using data management interface 435.

In various embodiments, sensor devices interface 140 provides a system for collection, filtering, and access to sensor data. Sensor devices interface 140 can provide management and monitoring of sensor devices 110 by printing labels, operating sensors, light stacks, message boards, carousels, and the like. In some embodiments, sensor devices interface 140 provides scalability that allows access to sensor data without being tied to one specific vendor application.

Virtualization and Quality of Sensor Data

In various embodiments, system 100 provides virtualization and quality of sensor data. In general, virtualization of sensor data allows a first object to inherit all or a portion of sensor data related one or more other objects. In other words, information related to the first object can be derived or inherited from sensor data, such as temperature information and GPS location information, related to a second object and/or a third object. In general, quality of sensor data allows applications to determine who much to trust sensor data that has been inherited or derived from another object.

In various embodiments, system 100 generates information related to a first object using a containment hierarchy. In general, a containment hierarchy is any set of rules, policies, relationships, criteria, and interactions that describe an association between the first object and the second object. In various embodiments, a containment hierarchy describes relationships between one or more properties of the first object and one or more properties of the second object. Some examples of a property are a name, an identifier, product information, an identifier of a sensor associated with an object, and the like.

Figure 5:
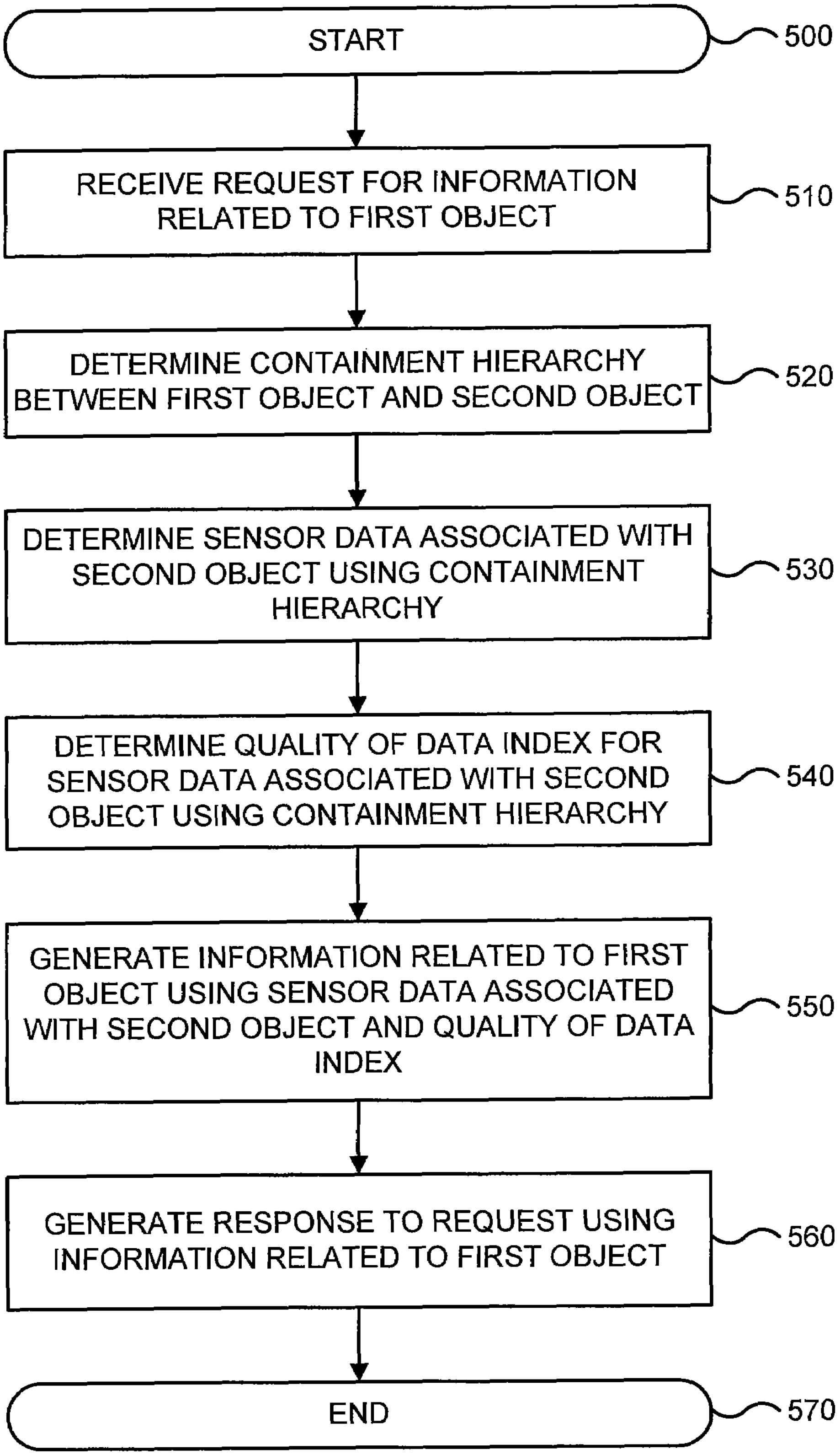
FIG. 5 is a simplified flowchart for providing virtualization of sensor data using a containment hierarchy in one embodiment according to the present invention.

FIG. 5 is a simplified flowchart for providing virtualization of sensor data using a containment hierarchy in one embodiment according to the present invention. The processing depicted in FIG. 5 may be performed by software modules (e.g., instructions or code) executed by a processor of a computer system, by hardware modules, or combinations thereof. FIG. 5 begins in step 500.

Figure 6:
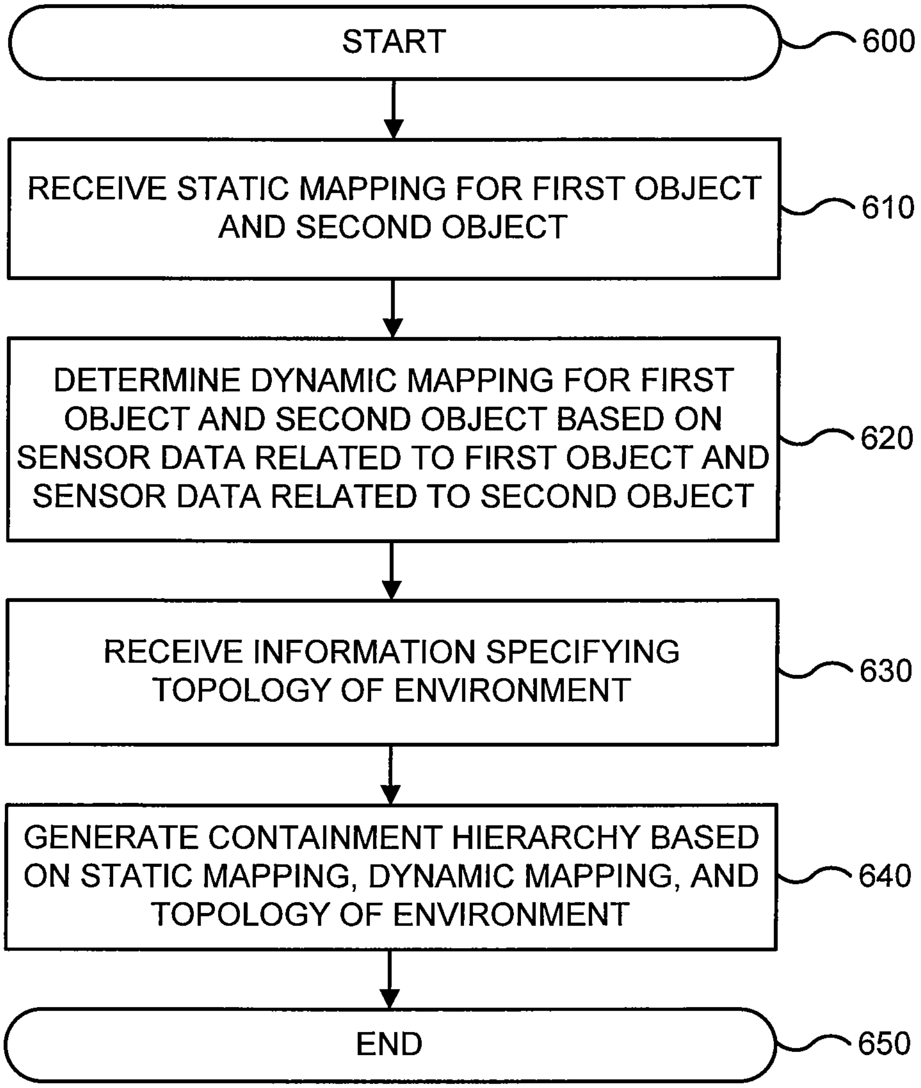
FIG. 6 is a flowchart for generating a containment hierarchy in one embodiment according to the present invention.
Figure 7:
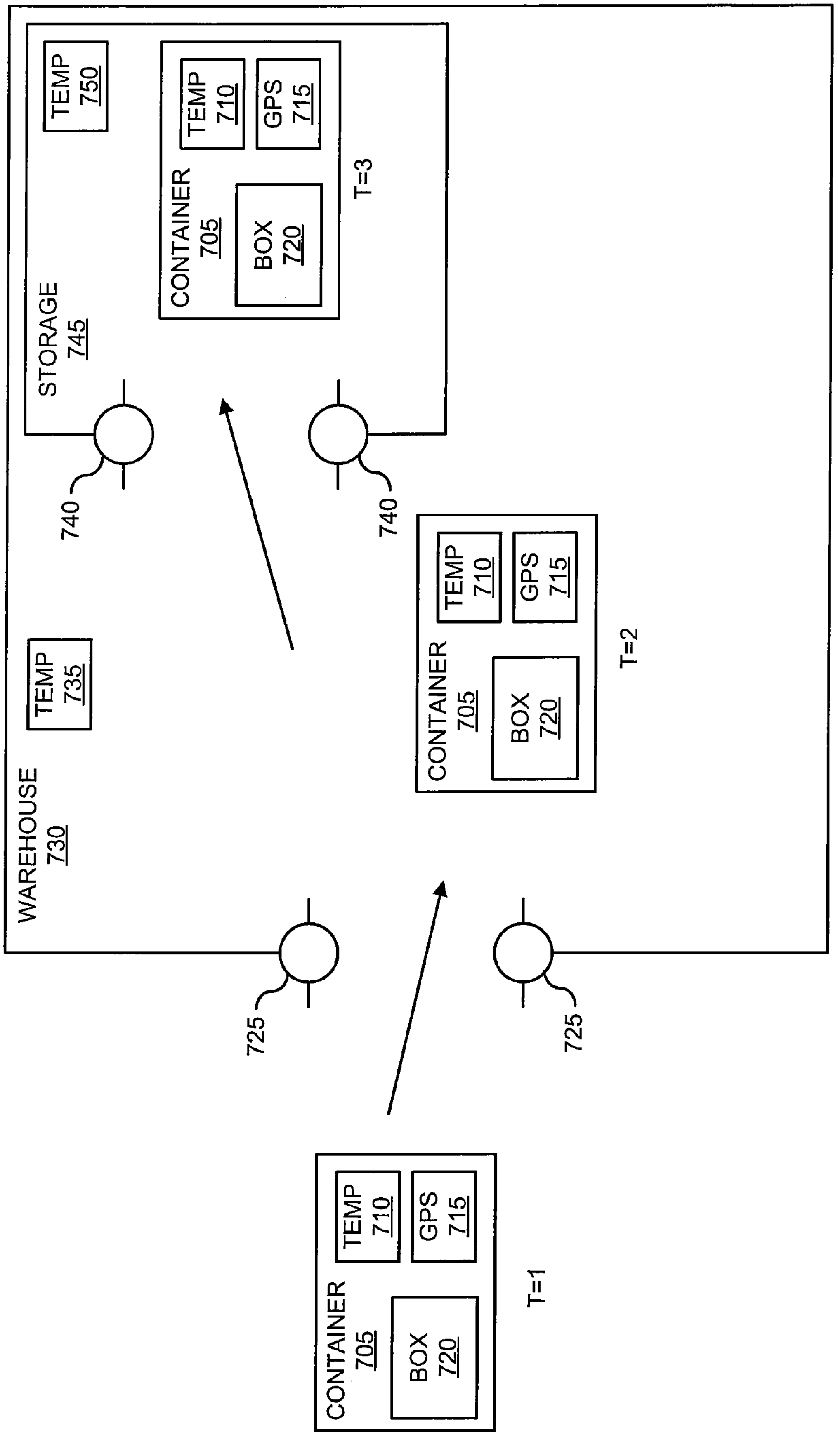
FIG. 7 depicts movement and location of a container in one embodiment of the present invention.

In step 510, system 100 receives a request for information related to a first object (e.g., box 720 of FIG. 7). The request may be any signal, message, packet, or communications associated with the first object. In step 520, system 100 (e.g., using sensor devices interface 140) determines a containment hierarchy between the first object and a second object (e.g., container 705 of FIG. 7). In various embodiments, sensor devices interface 140 creates or generates the containment hierarchy between the first object and a second object. In some embodiments, sensor devices interface 140 performs a lookup based on a property of the first object to identify one or more containment hierarchies associated with the first object and a second object. On example of creating a containment hierarchy is described below with respect to FIG. 6.

In step 530, system 100 determines sensor data associated with the second object using the containment hierarchy. For example, system 100 determines the location of container 705. In step 540, system 100 determines a quality of data index (or trust level) for the sensor data associated with the second object. In general, a quality of data index is any number, symbol, indicator, or pointer that indicates a level of trust or accuracy. In one example, if information related to the location of container 705 has a recent timestamp, system 100 may determine a quality of data index that indicates a high or strong level of trust (e.g., 8/10) for the location information. In another example, if information for the location of container 705 has a timestamp more than two weeks old, system 100 may determine a quality of data index that indicates a low or weak level of trust (e.g., 2/10) for the location information.

In step 550, system 100 generates information related to the first object using the sensor data associated with the second object and the quality of data index. Continuing the previous example, system 100 associates the location information of container 705 with the location of box 720. System 100 may update a database (e.g., using data management services 150) with the location information for box 720.

In step 560, system 100 generates a response to the request using the information related to the first object. FIG. 5 ends in step 570.

Accordingly, in various embodiments, system 100 determines information related to a first object using a containment hierarchy from sensor data related to a second object. Various sensor devices, such as environmental sensors and location tracking devices may be used along side traditional RFID technologies without the added expense and complexities of embedded devices. For example, system 100 allows sensor data from temperature sensors and GPS location devices to be associated with a passive RFID tag to determine location history and temperature exposure of items associated with the tag. While two objects are described in the above example, it should be understood that the disclosure may apply to any number of objects.

FIG. 6 is a flowchart for generating a containment hierarchy between a first object and a second object in one embodiment according to the present invention. FIG. 6 begins in step 600.

In step 610, system 100 receives a static mapping for the first object and a second object. A static mapping is generally created by a user, operator, or administrator of system 100 or sensor devices interface 140. For example, a user may create a "pallet" in which the first object, such as a refrigerated container identified by an RFID tag, is said to store other objects, such one or more boxes each identified by an RFID tag. Labels encoded with these identifiers are placed on the physical container and the one or more boxes, which are then placed in a physical container. In some embodiments, the static mapping may indicate that detection of the presence of a unique identifier associated with one of the boxes also indicates the presence of the other boxes and the container. In another example, the user indicates that a temperature sensor and GPS device are linked to the refrigerated container. The user may also indicate a set of properties of an object, such as insulation, durability, quality, water proofing, paper, plastic, and the like.

In step 620, system 100 determines a dynamic mapping for the first object and the second object based on sensor data related to the first object and sensor data related to the second object. In general, the dynamic mapping is based on observation (i.e., sensor data) of the objects. For example, in various embodiments, system 100 collects sensor observation. System 100 then determines the dynamic mapping based on the collected sensor observations. In some embodiments, system 100 may modify or update the dynamic mapping based on collected sensor information. Furthermore, a history may be preserved to generate a state or context between the first object and the second object. In some embodiments, the context may be represented by a state machine (e.g., state machine 900 of FIG. 9) created based on the observations and sensor data.

In step 630, system 100 receives information specifying topology of an environment. In general, information specifying the topology of an environment specifies the environment in which the first object and the second object are likely to be found. This includes supply chain routes, placement and location of interrogators/readers, notifications devices, placement and location of machinery, associations between physical locations, and the like.

In step 640, system 100 generates the containment hierarchy between the first object and the second object based on the static mapping, the dynamic mapping, and the topology of an environment. In various embodiments, system 100 stores the containment hierarchy for subsequent use to derived information related to the first object from sensor data associated with one or more properties of the second object. FIG. 6 ends in step 650.

FIG. 7 depicts movement and location of container 705 tracked by system 100 in one embodiment of the present invention. FIG. 7 depicts positions of a container 705 at various times T=1, T=2, and T=3.

In this example, container 705 includes a temperature sensor 710, a global positioning system (GPS) module 715, and box 720. Container 705 may include an RFID tag, and other types of sensors, such as audio/video capture devices, environmental sensors (e.g., humidity), electro-magnetic sensors, radiation sensors, and the like. Container 705 may further include more than one box 720. Box 720 is associated with an RFID tag allowing detection of the presence of the box 720 by an RFID reader.

Warehouse 730 includes readers 725 positioned above a door into warehouse 730, a temperature sensor 735, and a storage area 745. Storage 745 includes readers 740 positions above a door into storage 745 and a temperature sensor 750.

As shown in FIG. 7, at time T=1, container 705 is located outside of warehouse 730. After time T=1, and before time T=2, container 705 passes near readers 725 and enters warehouse 730. Readers 725 register the presence of box 720. Readers 725 may further register the presence of container 705 if associated with an RFID tag or transponder. At time T=2, container 705 is located within warehouse 730.

After time T=2, and before time, T=3, container 705 passes near readers 740 and enters storage 745. Readers 740 register the presence of box 720. Readers 725 may further register the presence of container 705 if associated with an RFID tag or transponder. At time T=3, container 705 is located within storage 745 of warehouse 730.

Figure 8A:
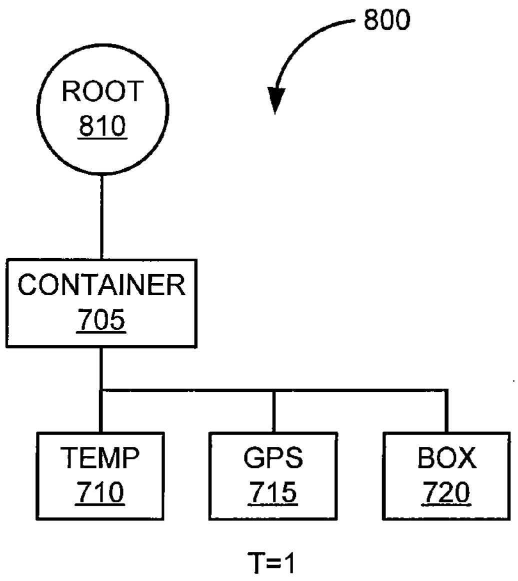
FIGS. 8A, 8B, and 8C depict various containment hierarchies generated in one embodiment of the present invention.
Figure 8B:
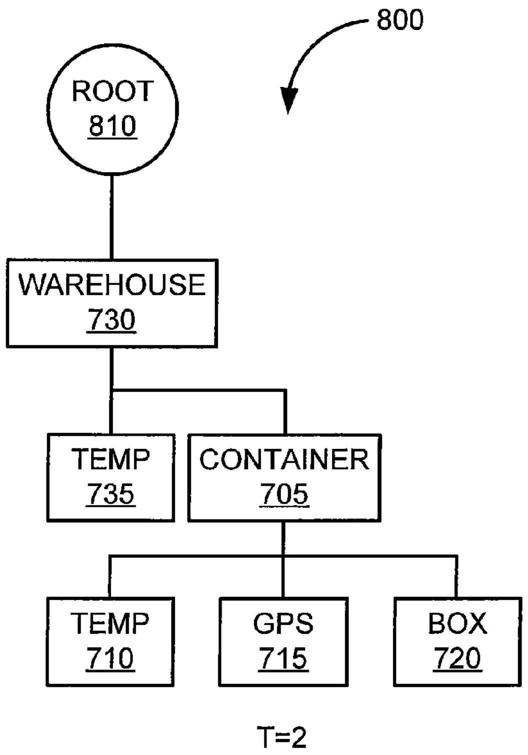
Figure 8C:
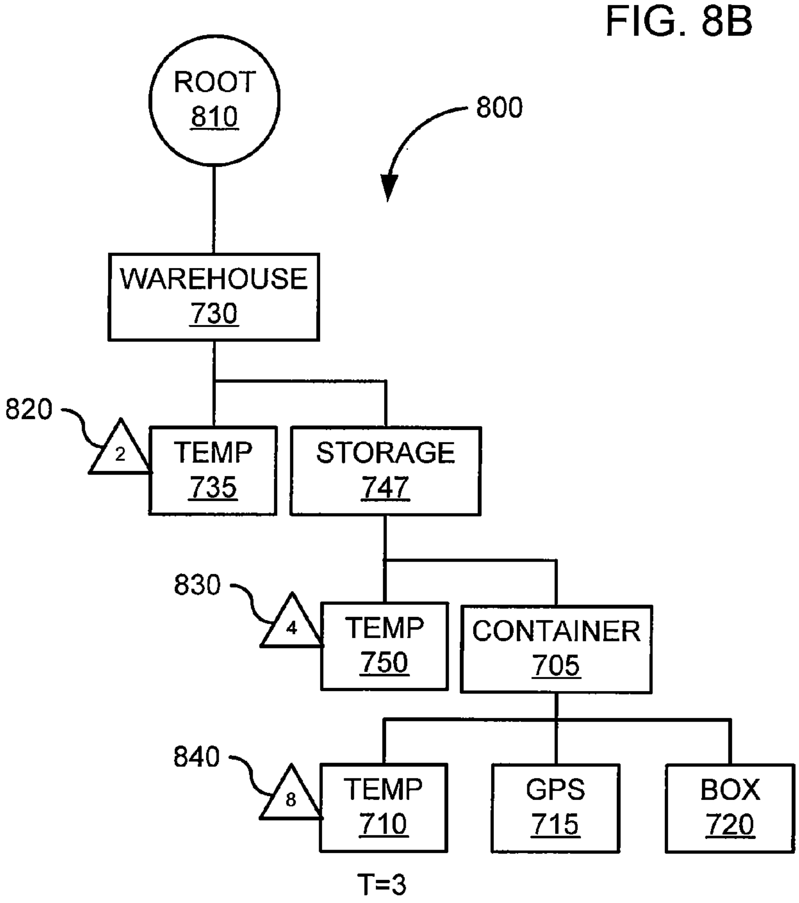

FIGS. 8A, 8B, and 8C depict various containment hierarchies generated in one embodiment of the present invention. As shown in FIG. 8A, containment hierarchy 800 at time T=1 includes a root node 810 having an element or node for container 705. Containment hierarchy 800 further includes nodes for temperature sensor 710, GPS 715, and box 720 branching from the node for container 705.

As shown in FIG. 8B, at time T=2, containment hierarchy 800 includes root node 810 having a node or element for warehouse 730. Containment hierarchy 800 includes nodes for temperature sensor 735 and container 705 branching from the node for warehouse 730. Containment hierarchy 800 retains the nodes of temperature sensor 710, GPS 715, and box 720 branching from the node for container 705. Accordingly, after container 705 is moved into warehouse 730, at time T=2, the root node of containment hierarchy 800 changes to be warehouse 730.

In general, system 100 generates containment hierarchy 800 using static mappings, dynamic mappings, and the topology of an environment to build associations or relationships between objects. For example, in containment hierarchy 800 of FIG. 8B, a user may specify a static map or static mapping that box 720 is located within container 705. The user may further specify static mappings that describe the relationships between container 705, temperature sensor 710, and GPS 715.

Containment hierarchy 800 of FIG. 8B changes based on observations indicating that container 705 has entered warehouse 730. In this example, information specifying topology of the environment in which container 705 is found or operates indicates that readers 725 are positioned above a doorway entering/exiting warehouse 730. By registering the presence of container 705 or box 720 using readers 725, a dynamic mapping may be generated indicating that container 705 is now positioned within warehouse 730. A history of observations or state may be kept, such as state machine 900, to indicate whether detection of container 705 by readers 725 indicates an entrance or exit with regard to warehouse 730.

As shown in FIG. 8C, at time T=3, containment hierarchy 800 includes root node 810 having a node or element for warehouse 730. Containment hierarchy 800 includes nodes for temperature sensor 735 and storage 745 branching from the node for warehouse 730. Containment hierarchy 800 includes nodes of temperature sensor 750 and container 705 branching from the node for storage 745. Finally, containment hierarchy 800 retains the nodes of temperature sensor 710, GPS 715, and box 720 branching from the node for container 705.

In some embodiments, as shown in FIG. 8C, containment hierarchy 800 includes weighting values associated with one or more of its elements or nodes. In this example, weight 820 having a value of 2 is associated with the element or node for temperature sensor 735. Weight 830 having a value of 4 is associated with the element or node for temperature sensor 750. Weight 830 having a value of 8 is associated with the element or node for temperature sensor 710. In various embodiments, system 100 associates weighting values with an element or node to provide a trust level or quality of data index for the given element or node. In other words, system 100 provides an indicator as to the quality of sensor data derived or inherited from the second object. System 100 generates quality of data indexes using the weighing values to allow users and applications to make decisions how to treat information about a first object derived or inherited from properties of a second object.

Figure 9:
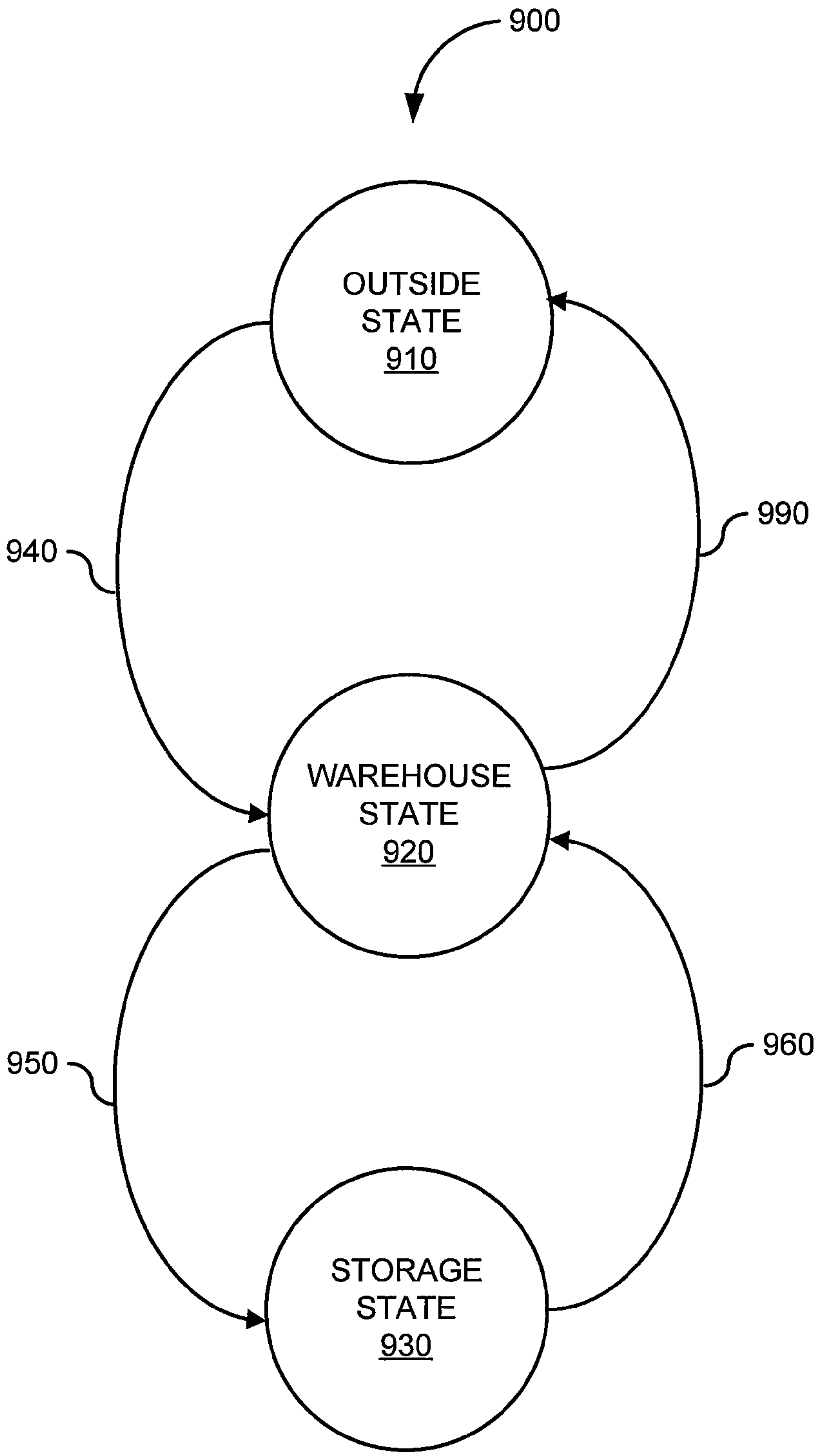
FIG. 9 is a state machine based on sensor data from observations of the container of FIG. 7 in one embodiment according to the present invention.

FIG. 9 is a state machine 900 based on sensor data from observations of the container of FIG. 7 in one embodiment according to the present invention. In this example, state machine 900 includes an outside state 910, a warehouse state 920, a storage state 930, and transitions 940, 950, 960, and 970.

Outside state 910 transitions to warehouse state 920 using transition 940. Warehouse state 920 transitions to storage state 930 using transition 950. Storage state 930 transitions to warehouse state 920 using transition 960. Warehouse state 920 transitions to outside state 910 using transition 970. In general, states and transitions of state machine 900 may be defined by a user or constructed using sensor data.

State machine 900 may be used to provide context information about objects tracked by system 100. For example, at time T=2, container 705 (FIG. 7) has the context of being in warehouse 730 (e.g., warehouse state 920). In some embodiments, system 100 tracks the previous state of an object (e.g., at time T=1, outside state 910). In still further embodiments, system 100 determines a state history based on observation using sensor data. For example, as the current state is inside warehouse, and the most recent position data in the sensor data comes from readers 725, system 100 determines that the previous state was outside (e.g., outside state 910).

Quality of Data

As discussed previously, system 100 provides quality of data to derived or inherited sensor data. In general, a quality of data index is any number, indicators, or symbol that provides an indication of the level of trust that may be applied to a portion of sensor data. For example, GPS location information may be assigned a low level of trust during a period of time when the source of the GPS location information is located within a warehouse where GPS signals are weak. However, the same GPS location information may be assigned a higher quality of data index during a different period when the source of the GPS location information is located in transit from one destination to another.

Figure 10:
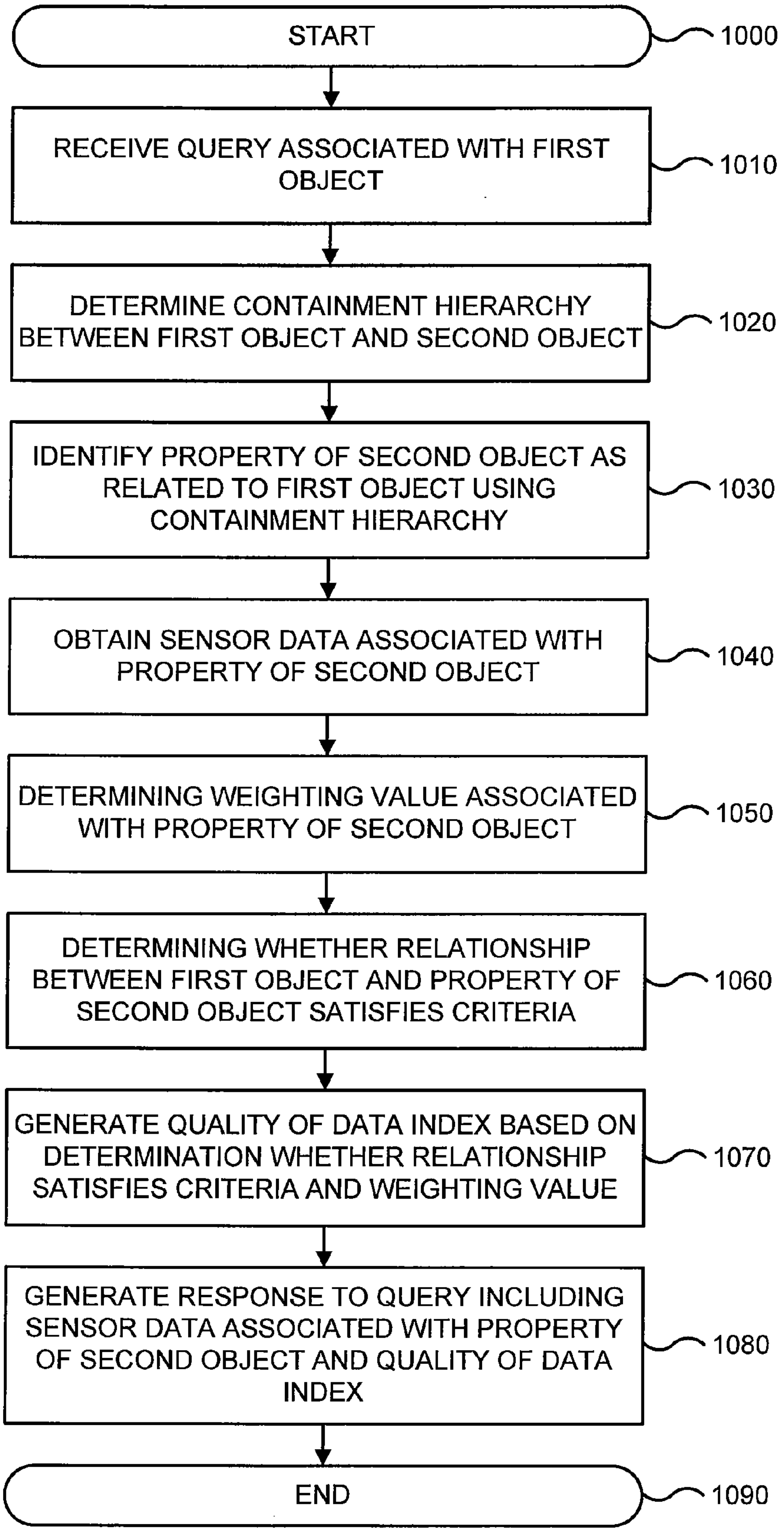
FIG. 10 is a flowchart for providing quality of data for sensor data in one embodiment according to the present invention.

FIG. 10 is a flowchart for providing quality of data for sensor data in one embodiment according to the present invention. FIG. 10 begins in step 1000.

In step 1010, system 100 receives a query associated with a first object (e.g., box 720 of FIG. 7). In one example, the query includes a statement "retrieve location of all boxes exposed to a temperature above 25 degrees Celsius in the last week" formatted according to a query language, such as SQL.

In step 1020, system 100 determines a containment hierarchy between the first object and a second object (e.g., containment hierarchy 800 of FIG. 8). In step 1020, system 100 identifies a property of the second object as related to the first object using the containment hierarchy. In one example, system 100 builds containment hierarchy 800 at each of the various times T=1, T=2, and T=3 which fall within the query criteria "in the last week." System 100 then identifies in containment hierarchy 800 at each of the various times T=1, T=2, and T=3 relationships between box 705 and temperature sensors 715, 735, and 750.

In step 1040, system 100 obtains sensor data associated with the property of the second object. Continuing the example, system 100 obtains temperature data registered by temperature sensors 715, 735, and 750 that satisfy the criteria of the query.

In step 1050, system 100 determines weighting value associated with the property of the second object. In some embodiments, system 100 obtains the weighting value from containment hierarchy 800. In other embodiments, the weighting values may be provided by a user.

In step 1060, system 100 determines whether the relationship between the first object and the property of the second object, identified in step 1030, satisfies pre-determined criteria. For example, if container 705 is identified as highly insulated, then the relationship between the box 720 and temperature sensor 715 is satisfied, because box 720 is located within container 705 which includes temperature sensor 715. The relationships between box 720 and temperature sensors 735 and 750 does not fully satisfy the criteria because the insulation of the container 705 affects the reliability of temperature data from temperature sensors 735 and 750 as applied to box 720.

In step 1070, system 100 generates a quality of data index for the sensor data associated with the second object based on the determination whether the relationship satisfies the criteria and the weighting value. For example, at times T=1, T=2, and T=3, box 720 is including within container 705 that has temperature sensor 710. As temperature sensor 710 is physically closer to box 720, data derived or inherited from temperature sensor 710 about box 720 may be given a quality of data index of 100, on a scale of 1 to 100. In another example, if container 705 is insulated, then data from temperature sensor 715 may be given a quality of data index of 100, and data derived or inherited about box 720 from temperature sensors 735 and 750 may be given quality of data index of below 20.

In step 1080, system 100 generates a response to the query including the sensor data associated with the property of the second object and the quality of data index. FIG. 10 ends in step 1090.

As described above, system 100 provides for virtualization of sensor data allowing one or more objects to inherit sensor data from other objects. This allows the retrieval of sensor data not otherwise associated with an object due to limitations of traditional sensor gathering system. Using system 100, a virtual inheritance of sensor data is created thru a mix of physical and logical association of sensors and objects. Sensor data can be deduced on any object monitored by system 100, whether it is directly observed or not. Furthermore, when this virtual sensor data is derived or inherited, most application will just take what is returned. However, using a trust level or quality of data index, system 100 allows application 130 to determine the accuracy and quality of the derived or inherited sensor data for an object.

Figure 11:
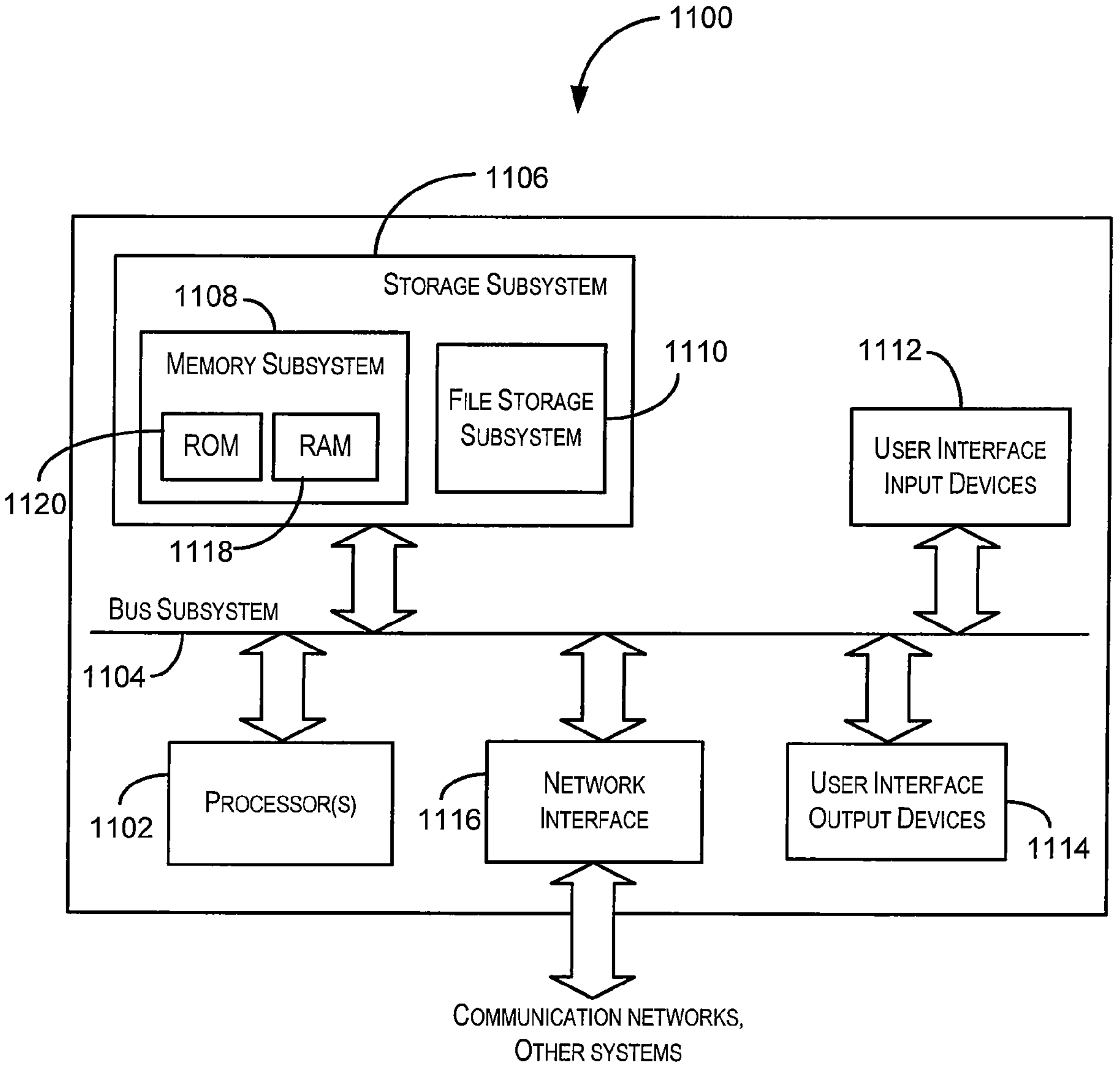
FIG. 11 is a simplified block diagram of a computer system that may be used to practice embodiments of the present invention.

FIG. 11 is a simplified block diagram of a computer system 1100 that may be used to practice embodiments of the present invention. As shown in FIG. 11, computer system 1100 includes a processor 1102 that communicates with a number of peripheral devices via a bus subsystem 1104. These peripheral devices may include a storage subsystem 1106, comprising a memory subsystem 1108 and a file storage subsystem 1110, user interface input devices 1112, user interface output devices 1114, and a network interface subsystem 1116.

Bus subsystem 1104 provides a mechanism for letting the various components and subsystems of computer system 1100 communicate with each other as intended. Although bus subsystem 1104 is shown schematically as a single bus, alternative embodiments of the bus subsystem may utilize multiple busses.

Network interface subsystem 1116 provides an interface to other computer systems, and networks, and devices. Network interface subsystem 1116 serves as an interface for receiving data from and transmitting data to other systems from computer system 1100.

User interface input devices 1112 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1100.

User interface output devices 1114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1100.

Storage subsystem 1106 may be configured to store the basic programming and data constructs that provide the functionality of the present invention. Software (code modules or instructions) that provides the functionality of the present invention may be stored in storage subsystem 1106. These software modules or instructions may be executed by processor(s) 1102. Storage subsystem 1106 may also provide a repository for storing data used in accordance with the present invention. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read only memory (ROM) 1120 in which fixed instructions are stored. File storage subsystem 1110 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 1100 can be of various types including a personal computer, a portable computer, a workstation, a network computer, a mainframe, a kiosk, or any other data processing system. Due to the ever-changing nature of computers and networks, the description of computer system 1100 depicted in FIG. 11 is intended only as a specific example for purposes of illustrating the preferred embodiment of the computer system. Many other configurations having more or fewer components than the system depicted in FIG. 11 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method for generating tracking information for items associated with RFID tags, the method comprising:

receiving, at one or more computer systems, a static mapping specifying that a physical container encloses a physical item for a first predetermined amount of time, at least one of the physical item or the physical container having attached thereon one or more RFID tags;

generating, with one or more processors associated with the one or more computer systems, a set of dynamic mappings between the physical container or the physical item and one or more sensors that generate non-location based environmental data as the physical container passes through a topology having a beginning point and an end point, each dynamic mapping in the set of dynamic mappings existing for an amount of time that is smaller than the first predetermined amount of time that does not overlap with portions of the first predetermined amount of time that correspond to both the beginning point and the end point of the topology;

determining, at the one or more computer systems, a value within a level of trust scale for the non-location based environmental data generated by at least one of the one or more sensor devices that forms part of at least one dynamic mapping in the set of dynamic mappings; and generating, with the one or more processors associated with the one or more computer systems, tracking information about the physical item in response to a request from one or more applications relevant to the amount of time during which the non-location based environmental data generated by the at least one of the one or more sensor devices is mapped according to the at least dynamic mapping in the set of dynamic mappings based on a determination using the value within the level of trust scale whether to include the non-location based environmental data in a response to the request.

2. The method of claim 1 further comprising:

communicating the response to the one or more applications.

3. The method of claim 1 further comprising:

receiving, at the one or more computer systems, information quantifying quality of the non-location based environmental data; and determining, with the one or more processors associated with the one or more computer systems, the value within the level of trust based on the information quantifying quality of the non-location based environmental data.

4. The method of claim 3 further comprising:

determining, with the one or more processors associated with the one or more computer systems, to include the non-location based environmental data attribute in the response; and populating, with the one or more processors associated with the one or more computer systems, an environmental data attribute with the non-location based environmental data.

5. The method of claim 1 further comprising generating a containment hierarchy with at least one dynamic mapping between the physical container or the physical item and an element in the topology.

6. The method of claim 1 further comprising:

receiving, at the one or more computer systems, sensor data from the one or more sensor devices configured to generate presence data; and storing an identifier associated with an RFID tag in the sensor data in an attribute tracked for the item.

7. The method of claim 1 further comprising:

receiving, at the one or more computer systems, sensor data from the at least one of the one or more sensor devices and storing temperature data as the non-location based environmental data.

8. A non-transitory computer-readable medium storing computer-executable code for generating tracking information for items associated with RFID tags, the non-transitory computer-readable medium comprising:

code for receiving a static mapping specifying that a physical container encloses a physical item for a first predetermined amount of time, at least one of the physical item or the physical container having attached thereon one or more RFID tags;

code for generating a set of dynamic mappings between the physical container or the physical item and one or more sensors that generate non-location based environmental data as the physical container passes through a topology having a beginning point and an end point, each dynamic mapping in the set of dynamic mappings existing for an amount of time that is smaller than the first predetermined amount of time that does not overlap with portions of the first predetermined amount of time that correspond to both the beginning point and the end point of the topology;

code for determining a value within a level of trust scale for the non-location based environmental data generated by at least one of the one or more sensor devices that forms part of at least one dynamic mapping in the set of dynamic mappings; and code for generating tracking information about the physical item in response to a request from one or more applications relevant to the amount of time during which the non-location based environmental data generated by the at least one of the one or more sensor devices is mapped according to the at least dynamic mapping in the set of dynamic mappings based on a determination using the value within the level of trust scale whether to include the non-location based environmental data in a response to the request.

9. The non-transitory computer-readable medium of claim 8 further comprising:

code for communicating the response to the one or more applications.

10. The non-transitory computer-readable medium of claim 8 further comprising:

code for receiving information quantifying quality of the non-location based environmental data; and code for determining the value within the level of trust based on the information quantifying quality of the non-location based environmental data.

11. The non-transitory computer-readable medium of claim 10 further comprising:

code for determining to include the non-location based environmental data attribute in the response; and code for populating an environmental data attribute with the non-location based environmental data.

12. The non-transitory computer-readable medium of claim 8 further comprising code for generating a containment hierarchy with at least one dynamic mapping between the physical container or the physical item and an element in the topology.

13. The non-transitory computer-readable medium of claim 8 further comprising:

code for receiving sensor data from the one or more sensor devices configured to generate presence data; and code for storing an identifier associated with an RFID tag in the sensor data in an attribute tracked for the item.

14. The non-transitory computer-readable medium of claim 8 further comprising:

code for receiving sensor data from the at least one of the one or more sensor devices and storing temperature data as the non-location based environmental data.

15. A system for generating tracking information for items associated with RFID tags, the system comprising:

a processor; and a memory in communication with the processor and configured to store a set of instructions which when executed by the processor become operational with the processor to:

receive a static mapping specifying that a physical container encloses a physical item for a first predetermined amount of time, at least one of the physical item or the physical container having attached thereon one or more RFID tags;

generate a set of dynamic mappings between the physical container or the physical item and one or more sensors that generate non-location based environmental data as the physical container passes through a topology having a beginning point and an end point, each dynamic mapping in the set of dynamic mappings existing for an amount of time that is smaller than the first predetermined amount of time that does not overlap with portions of the first predetermined amount of time that correspond to both the beginning point and the end point of the topology;

determine a value within a level of trust scale for the non-location based environmental data generated by at least one of the one or more sensor devices that forms part of at least one dynamic mapping in the set of dynamic mappings;

generate tracking information about the physical item in response to a request from one or more applications relevant to the amount of time during which the non-location based environmental data generated by the at least one of the one or more sensor devices is mapped according to the at least dynamic mapping in the set of dynamic mappings based on a determination using the value within the level of trust scale whether to include the non-location based environmental data in a response to the request.

16. The system of claim 12 wherein the set of instructions further become operational with the processor to:

communicate the response to the one or more applications.

17. The system of claim 12 wherein the set of instructions further become operational with the processor to:

receive information quantifying quality of the non-location based environmental data; and determine the value within the level of trust based on the information quantifying quality of the non-location based environmental data.

18. The system of claim 14 wherein the set of instructions further become operational with the processor to:

determine to include the non-location based environmental data attribute in the response; and populate an environmental data attribute with the non-location based environmental data.

19. The system of claim 12 wherein the set of instructions further become operational with the processor to generate a containment hierarchy with at least one dynamic mapping between the physical container or the physical item and an element in the topology.

20. The system of claim 12 wherein the set of instructions further become operational with the processor to:

receive sensor data from the one or more sensor devices configured to generate presence data; and store an identifier associated with an RFID tag in the sensor data in an attribute tracked for the item.

21. The system of claim 12 wherein the set of instructions further become operational with the processor to:

receive sensor data from the at least one of the one or more sensor devices and store temperature data as the non-location based environmental data.

* * * * *